(12) United States Patent
Hsu

(10) Patent No.: US 6,454,691 B1
(45) Date of Patent: Sep. 24, 2002

(54) METHOD FOR MAKING TUBULAR PRODUCT OF FIBER COMPOSITE MATERIAL

(76) Inventor: Patrick Hsu, No. 132, Chung Yi Street, Taichung City (TW)

( * ) Notice: Subject to any disclaimer, the term of this patent is extended or adjusted under 35 U.S.C. 154(b) by 0 days.

(21) Appl. No.: 09/588,595

(22) Filed: Jun. 7, 2000

(30) Foreign Application Priority Data

May 2, 2000 (TW) .......................................... 89207207

(51) Int. Cl.⁷ .............................................. B31C 11/04
(52) U.S. Cl. ...................... 493/278; 493/273; 493/274; 493/302
(58) Field of Search ................. 493/273, 274, 493/278, 302

(56) References Cited

U.S. PATENT DOCUMENTS

| | | | | |
|---|---|---|---|---|
| 2,751,936 A | * | 6/1956 | Dunlap et al. | |
| 2,785,700 A | * | 3/1957 | Yovanovich | |
| 2,789,075 A | * | 4/1957 | Stahl | |
| 3,038,832 A | * | 6/1962 | Carlson et al. | |
| 3,195,427 A | * | 7/1965 | Adams | |
| 3,471,350 A | * | 10/1969 | Berry et al. | |
| 3,522,122 A | * | 7/1970 | Ganahl | |
| 3,544,669 A | * | 12/1970 | Schock | |
| 5,833,592 A | * | 11/1998 | Howard et al. | 493/302 |

* cited by examiner

Primary Examiner—Eugene Kim
Assistant Examiner—Sameh Tawfik
(74) Attorney, Agent, or Firm—Browdy and Neimark, P.L.L.C.

(57) ABSTRACT

A method for making a tubular product of a fiber composite material is made up of the filament winding method and the sheet rolling method. The tubular product is formed of an inner layer and an outer layer. The inner layer is formed of a fiber tow by the filament winding method, whereas the outer layer is formed of one or more fiber sheets by the sheet rolling method.

18 Claims, 4 Drawing Sheets

METHOD FOR MAKING TUBULAR PRODUCT OF FIBER COMPOSITE MATERIAL

FIELD OF THE INVENTION

The present invention relates generally to a tubular product made of a fiber composite material, and more particularly to a method for making the tubular product of the fiber composite material.

BACKGROUND OF THE INVENTION

The tubular products, such as golf club, fishing rod, ski pole, etc., are generally made of a fiber composite material. There are currently the sheet-rolling method and the filament winding method, which are used to manufacture the tubular products. The sheet-rolling method involves the use of a plurality of fiber sheets which are preimpregnated with resin and are wound around a core shaft such that the fiber orientation forms a predetermined angle with the core shaft. The fiber sheets and the core shaft are heated and then cooled. A tubular product is finally formed by withdrawing the core shaft. The method allows the fiber sheets to be arranged in a way as desired. In light of some fibers being parallel to the longitudinal axis of the core shaft, the tubular product has a greater resistance to flexure. However, such a tubular product has a rigid spine that is formed at the junction of the ends of the fiber sheets which are wound on the core shaft. In addition, certain fiber sheets are wound irregularly. As a result, the tubular product so made is apt to have the uneven rigidity throughout the tubular product. The filament winding method involves the spiral winding of the fiber tows on a core shaft. The core shaft and the fiber tows are heated and then cooled. A tubular product is formed upon the withdrawal of the core shaft. The winding of the fiber tows on the core shaft is carried out with precision by a computer-aided technique. As a result, the tubular product has a uniformity in terms of physical properties. However, the tubular product is relatively less resistant to flexure in view of the fibers forming with the longitudinal direction of the core shaft an angle ranging between 30 and 45 degrees. In other words, the fibers can not be so arranged that they are parallel to the longitudinal axis of the core shaft.

SUMMARY OF THE INVENTION

The primary objective of the present invention is to provide a method for making a tubular product of a fiber composite material. The method of the present invention is free from the shortcomings of the prior art methods described above.

The method of the present invention is a hybrid of the filament winding method and the sheet rolling method. In the first place, a tubular body of a predetermined length is formed of fiber by the filament winding method. The tubular body is then provided with a predetermined number of the preimpregnated fiber sheets by the sheet rolling method such that the fiber sheets are rolled around the entire surface or a predetermined surface of the tubular body, and that the fiber orientation of the fiber sheets forms a predetermined angle with the longitudinal axis of the core shaft, and further that the fiber orientation of certain fiber sheets is parallel to the longitudinal axis of the core shaft. The tubular body is heated and then cooled. Upon removal of the core shaft from the tubular body, a tubular product of the method of the present invention is attained.

DETAILED DESCRIPTION OF THE INVENTION

Figure 1:
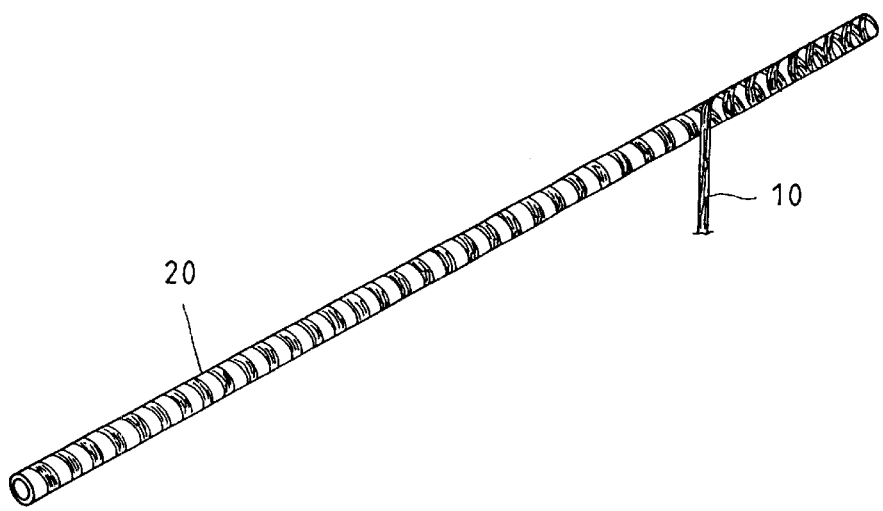
FIGS. 1 and 2 are schematic views of the making of a tubular body of a first preferred embodiment of the present invention.
Figure 2:
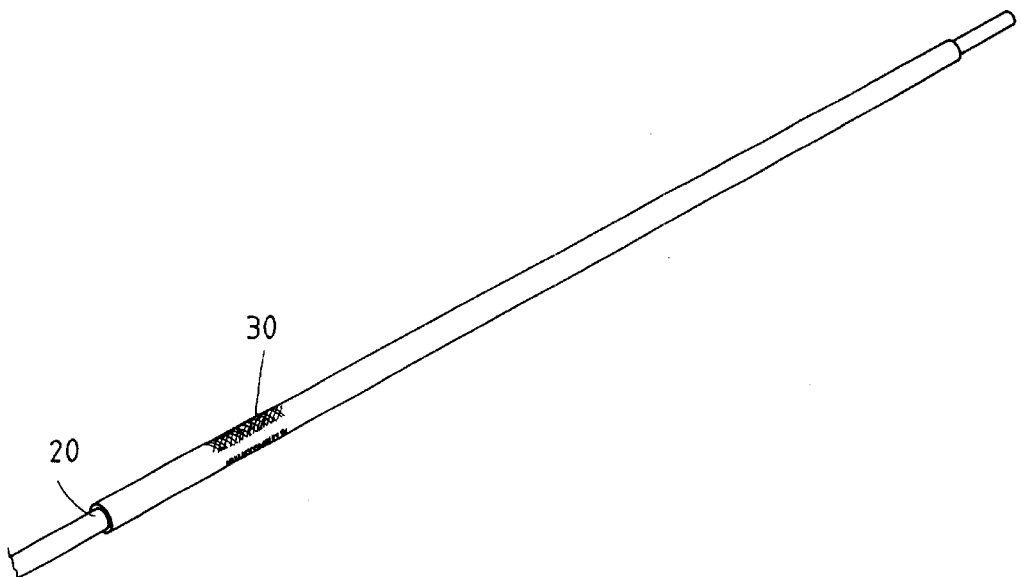

As shown in FIGS. 1 and 2, a method embodied in the present invention includes a first step in which a tapered tubular body 30 is formed of a tapered core shaft 20 and a preimpregnated fiber tow 10 which is wound on the core shaft 20 by the conventional filament winding method. The tubular body 30 has a predetermined length. The fiber tow 10 is a carbon fiber tow, which may be replaced by other reinforced fibers, such as glass fiber, boron fiber, etc.

Figure 3:
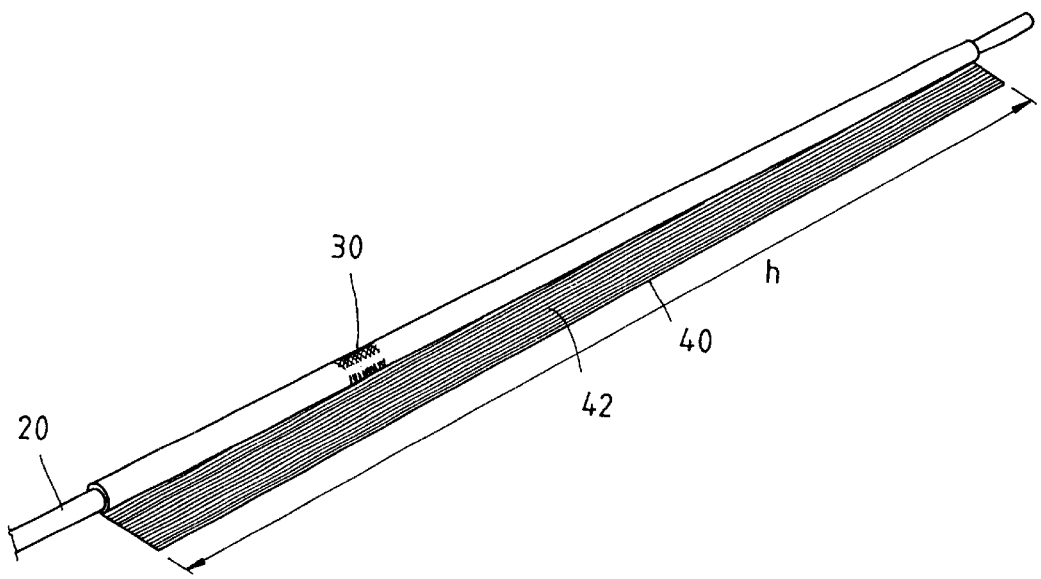
FIG. 3 shows a schematic view of the rolling of a fiber sheet on the tubular body of the first preferred embodiment of the present invention.

The wet and sticky tubular body 30 is then heated to take shape. Upon being cooled and hardened, the tubular body 30 is wrapped by a preimpregnated fiber sheet 40, as shown in FIG. 3, such that the orientation of the fiber 42 of the fiber sheet 40 is parallel to the direction of the longitudinal axis of the tubular body 30. The original form of the fiber sheet 40 is corresponding to trapezoid of the conical circumference of the tubular body 30. The height (h) of the trapezoid is corresponding to the length of the tubular body 30, thereby enabling the tubular body 30 to be covered in its entirety by the fiber sheet 40. The width of the trapezoid is such that the tubular body 30 is encircled once or more by the fiber sheet 40. The fiber sheet 40 is made of a carbon fiber, or other fibers.

Figure 4:
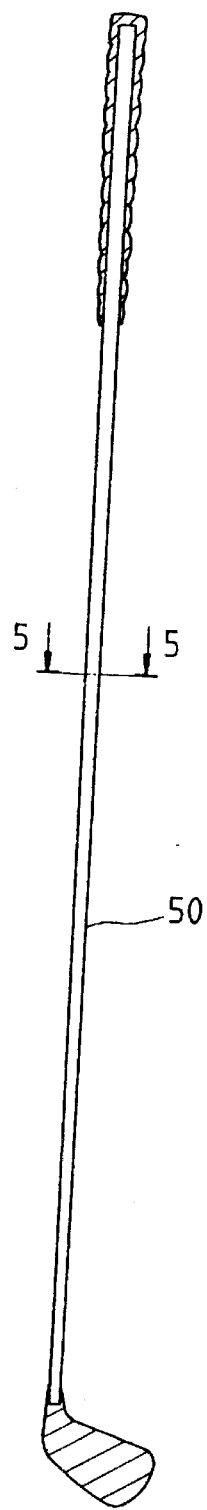
FIG. 4 shows a perspective view of a tubular product (golf club) of the first preferred embodiment of the present invention.

The encircled tubular body 30 is heated such that the carbon fiber of the fiber tow 10 and the carbon fiber of the fiber sheet 40 are fused together, and that a tapered tubular product 50 is formed, as shown in FIG. 4. The tapered tubular product 50 of the present invention is intended for use in making a golf club. As described above, the tubular body 30 of the present invention is heated twice. The first heating process is not essential and is intended to streamline the operation of covering the tubular body 30 with the fiber sheet 40. In other words, the fiber tow 10 and the fiber sheet 40 may be heated along with the tubular body 30 at the same time.

Figure 5:
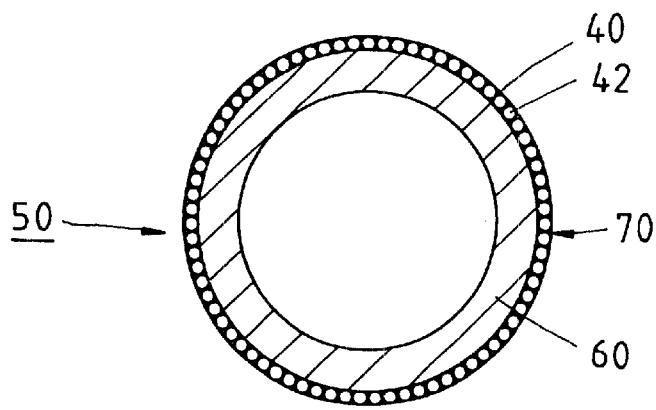
FIG. 5 shows a sectional view of a portion taken along the direction indicated by a line 5—5 as shown in FIG. 4.

As shown in FIG. 5, the tubular product 50 of the present invention comprises an inner layer 60 which is formed by the fiber tow 10, and an outer layer 70 which is formed by the fiber sheet 40. In light of the fiber tow 10 being arranged by the filament winding method, the inner layer 60 is uniform in hardness. The outer layer 70 is composed of fibers 42 extending along the direction of the longitudinal axis of the tubular product 50. As a result, the tubular product 50 is relatively greater in flexural strength as compared with the tubular products made by the prior art methods. It is therefore readily apparent that the tubular product 50 of the present invention is free from the deficiencies of the tubular product which is made by the conventional filament winding method or sheet rolling method.

Figure 6:
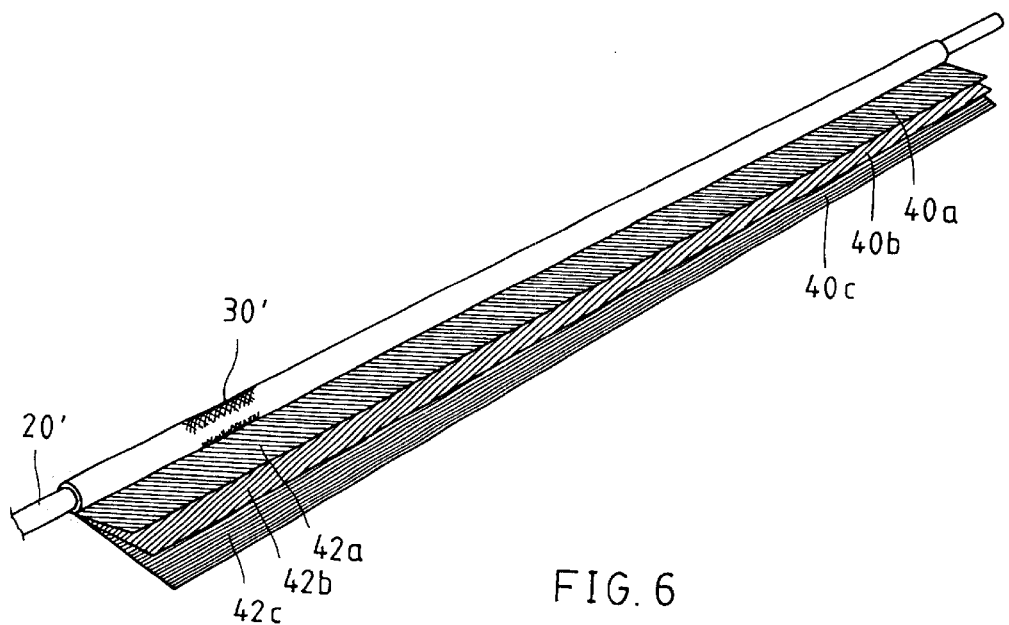
FIG. 6 is similar to FIG. 3 for showing a schematic view of the rolling of a fiber sheet on a tubular body of a second preferred embodiment of the present invention.
Figure 7:
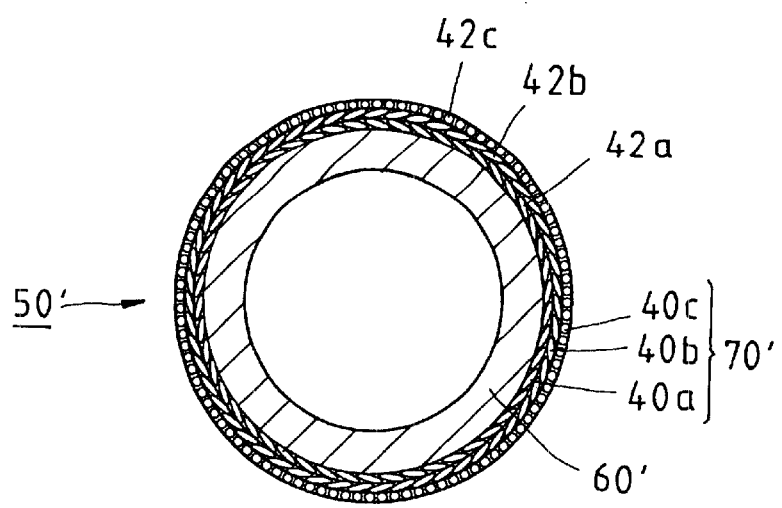
FIG. 7 shows a cross-sectional view of a tubular product of the second preferred embodiment of the present invention.

The embodiment of the present invention described above is to be regarded in all respects as being merely illustrative and not restrictive. Accordingly, the present invention may be embodied in other specific forms without deviating from the spirit thereof. For example, the tubular body 30' may be encircled in sequence by three fiber sheets 40a, 40b, and 40c, as shown in FIG. 6. The three fiber sheets 40a, 40b and 40c may be stacked together at a predetermined angle before they are encircled on the tubular body 30'. For example, the fiber orientations of fibers 42a, 42b and 42c of the fiber sheets 40a, 40b, and 40c form respectively with the longitudinal direction of the tubular body 30' an angle of positive 45 degrees, an angle of negative 45 degrees, and an angle of zero degree, as shown in FIG. 7. The tubular product 50' so made is composed of an inner layer 60', and an outer layer 70' which is jointly formed by the fiber sheets 40a, 40b, and 40c. The inner layer 60' is reinforced by the outer layer 70'. It must be noted here that the fiber orientation of the fiber sheets may be parallel to the longitudinal direction of the tubular body. However, such a parallel arrangement is not absolutely called for.

What is claimed is:

1. A method for making a tubular product comprising the steps of:
    winding of least one fiber strip tow (10) in a spiral around a core shaft (20) to form a tubular body (30);
    thereafter winding at least one fiber sheet (40) having a longitudinal length equal to that of the tubular body and preimpregnated with resin around the tubular body (30) so that the tubular body (30) is entirely encircled by the fiber sheet;
    wherein a width of the fiber sheet (40) is wider than that of the fiber strip tow (10) and the fiber sheet (40) is wound around the tubular body with a longitudinal length thereof parallel to that of the tubular body;
    wherein orientation of fiber (42) of the fiber sheet (40) form a predetermined angle with a longitudinal axis of the tubular body (30);
    thereafter heating the encircled tubular body (30) to form the tubular product (50).

2. The method as defined in claim 1, wherein the tubular body is heated to take form before the tubular body is encircled by the fiber sheet.

3. The method as defined in claim 1, wherein the tubular body is encircled by a plurality of fiber sheets in such a manner that fiber orientation of an outermost fiber sheet is parallel to the longitudinal axis of the tubular body, and that fiber orientations of inner fiber sheets form a predetermined angle with the longitudinal axis of the tubular body.

4. The method as defined in claim 3, wherein the fiber orientations of the inner fiber sheets form an angle of 45 degrees with the longitudinal axis of tubular body.

5. The method as defined in claim 1, wherein a plurality of fiber strip tows (10) are wound around the core shaft (20).

6. The method as defined in claim 1, wherein the tubular body is heated to take form before the tubular body is encircled by the fiber sheet.

7. The method as defined in claim 1, wherein the longitudinal length of the fiber sheet is equal to that of the tubular body so that the tubular body is encircled in its entirety by the fiber sheet.

8. The method as defined in claim 1, wherein the longitudinal length of the fiber sheet is less than that of the tubular body so that the tubular body is partially encircled by the fiber sheet.

9. The method as defined in claim 1, wherein the fiber orientations of the inner fiber sheets form an angle of 45 degrees with the longitudinal axis of tubular body.

10. The method as defined in claim 1, wherein a plurality of fiber strip tows (10) are wound around the core shaft (20).

11. A method for making a tubular product comprising the steps of:
    winding of least one fiber strip tow (10) in a spiral around a core shaft (20) to form a tubular body (30);
    thereafter winding at least one fiber sheet (40) preimpregnated with resin around the tubular body (30) so that the tubular body (30) is encircled;
    wherein a width of the fiber sheet (40) is wider than that of the fiber strip tow (10) and the fiber sheet (40) is wound around the tubular body with a longitudinal length thereof parallel to that of the tubular body;
    wherein orientation of fiber (42) of the fiber sheet (40) form a predetermined angle with a longitudinal axis of the tubular body (30);
    thereafter heating the encircled tubular body (30) to form the tubular product (50); and
    wherein the tubular body is encircled by a plurality of fiber sheets in such a manner that fiber orientation of an outermost fiber sheet is parallel to the longitudinal axis of the tubular body, and that fiber orientations of inner fiber sheets form a predetermined angle with the longitudinal axis of the tubular body.

12. A method for making a tubular product comprising the steps of:
    winding of least one fiber strip tow (10) in a spiral around a core shaft (20) to form a tubular body (30);
    thereafter winding at least one fiber sheet (40) preimpregnated with resin around the tubular body (30) so that the tubular body (30) is encircled;
    wherein a width of the fiber sheet (40) is wider than that of the fiber strip tow (10) and the fiber sheet (40) is wound around the tubular body with a longitudinal length thereof parallel to that of the tubular body;
    wherein orientation of fiber (42) of the fiber sheet (40) form a predetermined angle with a longitudinal axis of the tubular body (30);
    thereafter heating the encircled tubular body (30) to form the tubular product (50); and
    wherein the width of the fiber sheet is equal to the circumference of the tubular body.

13. The method as defined in claim 12, wherein the tubular body is heated to take form before the tubular body is encircled by the fiber sheet.

14. The method as defined in claim 12, wherein the longitudinal length of the fiber sheet is equal to that of the tubular body so that the tubular body is encircled in its entirety by the fiber sheet.

15. The method as defined in claim 12, wherein the longitudinal length of the fiber sheet is less than that of the tubular body so that the tubular body is partially encircled by the fiber sheet.

16. The method as defined in claim 12, wherein the tubular body is encircled by a plurality of fiber sheets in such a manner that fiber orientation of an outermost fiber sheet is parallel to the longitudinal axis of the tubular body, and that fiber orientations of inner fiber sheets form a predetermined angle with the longitudinal axis of the tubular body.

17. The method as defined in claim 16, wherein the fiber orientations of the inner fiber sheets form an angle of 45 degrees with the longitudinal axis of tubular body.

18. The method as defined in claim 12, wherein a plurality of fiber strip tows (10) are wound around the core shaft (20).

* * * * *